United States Patent [19]

Fuse et al.

[11] Patent Number: 4,989,240
[45] Date of Patent: Jan. 29, 1991

[54] TELEPHONE

[75] Inventors: Chihiro Fuse, Hirakata; Yutaka Morita, Nara, both of Japan

[73] Assignee: Sanyo Electric Co., Ltd., Osaka, Japan

[21] Appl. No.: 377,380

[22] Filed: Jul. 10, 1989

[30] Foreign Application Priority Data

Jul. 11, 1988 [JP] Japan .................................. 63-91825
Sep. 20, 1988 [JP] Japan ................................ 63-122919

[51] Int. Cl.⁵ .............................................. H04M 1/26
[52] U.S. Cl. ....................................... 379/355; 379/368
[58] Field of Search ................. 379/58, 355, 356, 357, 379/358, 359, 440, 447, 450, 453, 457, 368

[56] References Cited

U.S. PATENT DOCUMENTS 4,010,330 3/1977 Shio ..................................... 379/358
4,723,265 2/1988 Kamei et al. ......................... 379/58

FOREIGN PATENT DOCUMENTS 63-22659 5/1988 Japan .

Primary Examiner—James L. Dwyer
Attorney, Agent, or Firm—Armstrong, Nikaido, Marmelstein, Kubovcik & Murray

[57] ABSTRACT

A telephone having a closure removably covering an operation panel on the body of the telephone, and automatic dialing push buttons arranged on the closure for performing an automatic dialing function. Depression of the push button on the closure becomes effective when the operation panel is covered with the closure. When the push button is depressed in this state, pre-stored telephone number data is automatically transmitted to telephone lines as dial signals.

9 Claims, 12 Drawing Sheets

TELEPHONE

FIELD OF THE INVENTION

The present invention relates to telephones having a push-button for dialing, and more particularly to such telephones wherein when a specified push-button is depressed, a telephone number in the form of a series of digits and pre-stored in corresponding relation to the bush-button is automatically transmitted to telephone lines as dial signals.

BACKGROUND OF THE INvENTION

Telephones provided with a push-button comprising "0" to "9" digit keys have the dialing function of converting items of telephone number data entered by depressing some of the digit keys to dial signals in succession and transmitting the signals to telephone lines.

In recent years, such push-button telephones have a multiplicity of advanced functions to be performed by depressing push buttons. Typical of these functions is the so-called automatic dialing function which is disclosed in Examined Japanese Patent Publication SHO 63-22659, etc.

In an automatic dialing mode wherein the automatic dialing function is performed, a specified bush button is depressed, whereupon telephone number data pre- restored in corresponding relation to the button is automatically transmitted to the telephone lines on conversion to dial signals.

The automatic dialing function is useful since calls can be placed easily even by children.

With the conventional push-button telephones having the automatic dialing function, one or a plurality of push buttons for performing the automatic dialing function (hereinafter referred to as "automatic dialing push buttons") are arranged on the same operation panel as a plurality of push buttons for executing the usual dialing function (hereinafter referred to as "usual dialing push buttons"). Accordingly, there arises the problem that the user is liable to depress a wrong push button to place an unintended call. It is especially difficult for children to distinguish the automatic dialing push button from the usual dialing push buttons. The push-button arrangement therefore impairs the usefulness of the automatic dialing function.

SUMMARY OF THE INVENTION

An object of the present invention is to provide a telephone wherein the usual dialing push buttons irrelevant to the automatic dialing function are made inoperative in the automatic dialing mode to reliably prevent depression of these push buttons in this mode.

Another object of the invention is to provide a telephone which has a closure formed separately from the body of the telephone and equipped with at least one automatic dialing push button, the closure being settable in position to entirely cover an operation panel carrying the usual dialing push buttons so that the push button on the closure can be depressed.

Still another object of the invention is to provide a telephone of the type described which is free of the likelihood that the closure will be removed from the telephone body inadvertently by the user or mischievously by children in the automatic dialing mode.

The telephone of the present invention comprises a telephone body having an operation panel at least provided with usual dialing push buttons thereon, and a removable closure entirely covering the operation panel on the telephone body and provided with one or a plurality of automatic dialing push buttons on its surface.

The telephone body has a portion engageable with the closure and provided with an assembly for releasably locking the closure to the telephone body.

The locking assembly is provided with an assembly for preventing unlocking action of the assembly. A knob for operating the unlocking preventing assembly is provided on the bottom side of the telephone body.

While the closure is removed from the telephone body, the telephone is in the usual dialing mode in which the push buttons on the operation panel can be depressed.

The closure, when attached to the telephone body, sets the telephone in the automatic dialing mode in which the automatic dialing push buttons on the closure can be depressed. In this mode, the push buttons on the operation panel are covered with the closure and are not accessible. This obviates the likelihood that any push button other than the automatic dialing buttons will be depressed in error.

The unlocking preventing assembly, if made to function in the automatic dialing mode, eliminates the likelihood that the locking assembly will be unfastened inadvertently by the user or mischievously by a child to unlock the closure since the knob for the preventing assembly is provided on the bottom side of the telephone body, hence safety.

BRIEF DESCRIPTION OF THE DRAWINGS

FIGS. 1 to 9 show the mechanical construction of a first embodiment of the invention;

FIGS. 10 to 19 show the mechanical construction of another telephone as a second embodiment of the invention;

DETAILED DESCRIPTION OF EMBODIMENTS

Telephones embodying the invention will be described below in detail with reference to the drawings.

First Embodiment

Figure 1:
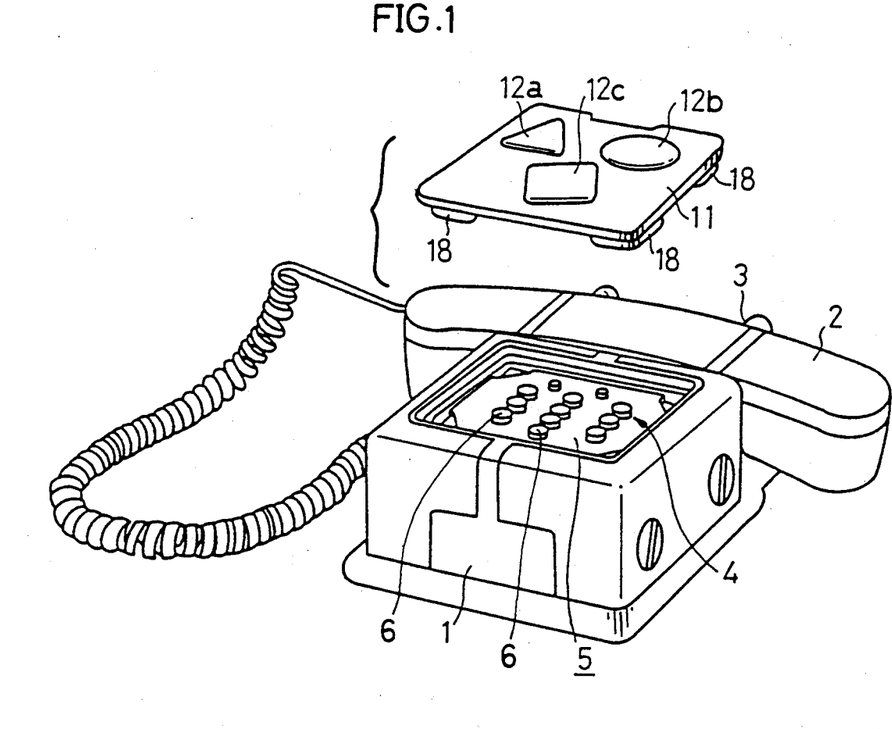
FIG. 1 is a perspective view of a telephone showing a closure as removed from the body of the telephone.

The telephone shown in FIG. 1 has a body 1 provided with a cradle 3 for supporting a handset 2 thereon. An operation panel 5 is disposed at the bottom of a recess 4 formed in the top side of the telephone body 1.

Figure 7:
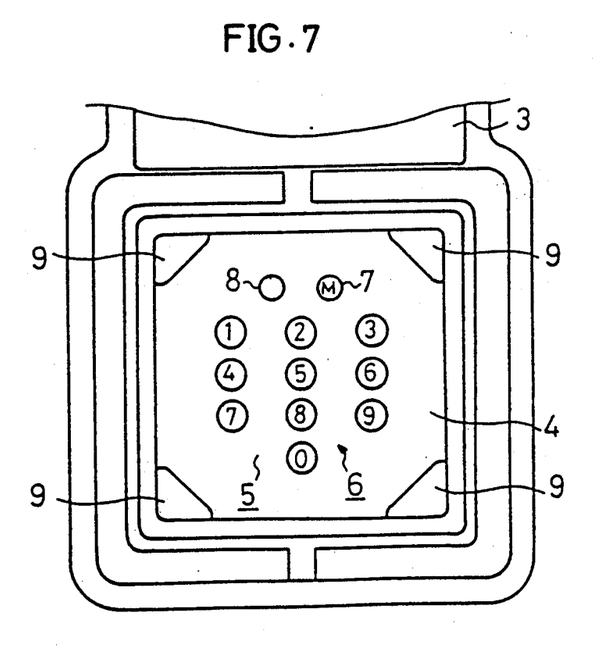
FIG. 7 is a plan view showing an operation panel on the telephone body.

With reference to FIG. 7, arranged on the operation panel 5 are usual dialing push buttons 6 which are digit keys, a memory key 7 for storing desired telephone numbers in a memory (not shown) housed in the body 1, and a mode change key 8 for changing the mode of the telephone. When the mode change key 8 is off, the telephone is in the usual dialing mode in which items of number data entered by some of the usual dialing push button 6 are converted to dial signals in succession, and the dial signals are transmitted to telephone lines. When the mode change key 8 is on, the telephone is set in the automatic dial mode in which pre-stored telephone number data is automatically converted to dial signals, which are then transmitted to the telephone lines.

Figure 9:
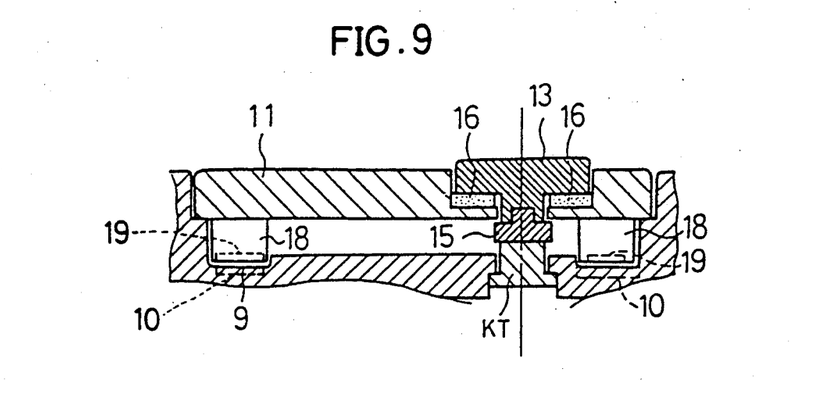
FIG. 9 is a sectional view showing an automatic dialing push button on the closure in engagement with a usual dialing push button on the operation panel.

A cavity 9 is formed in each of the four corners of the recessed portions 4 of the body 1. As seen in FIG. 9, a magnet 10 is embedded in the bottom of the cavity 9.

Figure 2:
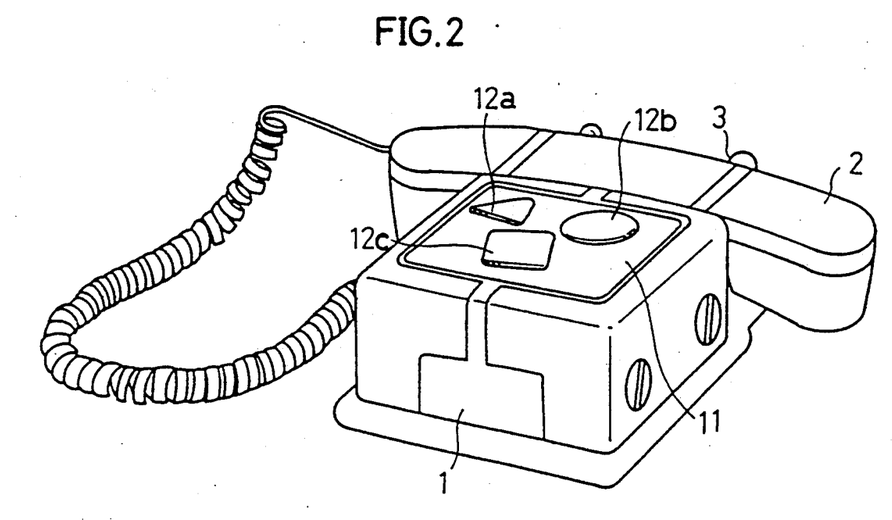
FIG. 2 is a perspective view showing the telephone with the closure attached to the body.
Figure 3:
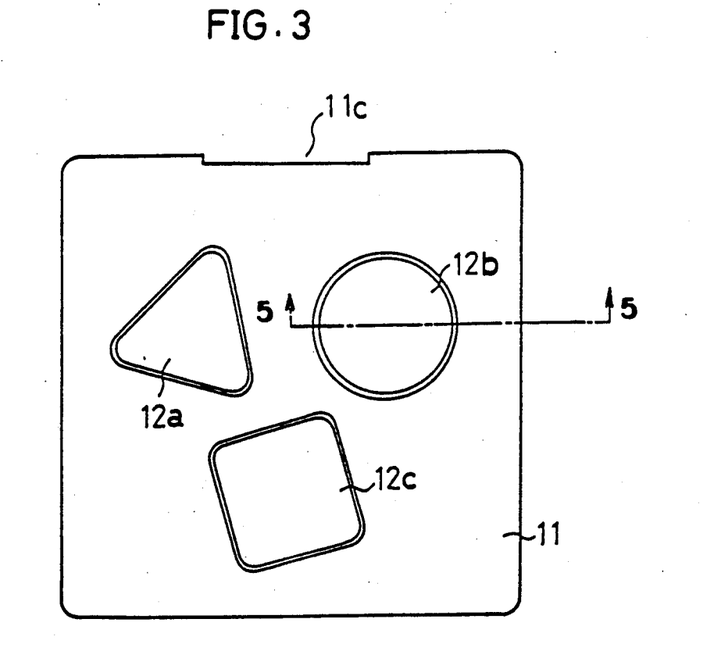
FIG. 3 is a plan view of the closure.

With reference to FIGS. 1 and 2, a closure 11 formed separately from the telephone body 1 is removably fittable in the recess 4 of the body 1. As seen in FIG. 3, a plurality of automatic dialing push buttons 12a, 12b and 12c are positioned on the top side of the closure 11 in corresponding relation to the specified push buttons (i.e. digit keys "1", "3" and "0" in the illustrated embodiment) among the usual dialing push buttons of FIG. 7.

The automatic dialing push buttons 12a, 12b, 12c are different from one another in shape so that the subscribers to be called and corresponding to the respective buttons can be visually distinguished from one another. The same effect as above can of course be achieved by forming the buttons in different colors or patterns for the different subscribers.

Figure 5:
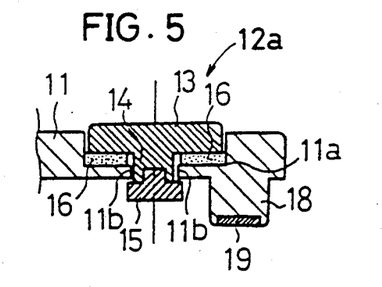
FIG. 5 is a fragmentary view in section taken along the line V—V in FIG. 3.

Referring to FIG. 5, each of the automatic dialing bush buttons 12a, 12b, 12c comprises a head 13 positioned in a cavity 11a formed in the closure 11, a stem 14 projecting from the bottom of the head 13 integrally therewith and extending downward through a hole 11b formed in the closure 11 and a retainer 15 attached to the lower end of the stem 14. An elastic member 16 is interposed between the head 13 and the closure 11.

Figure 4:
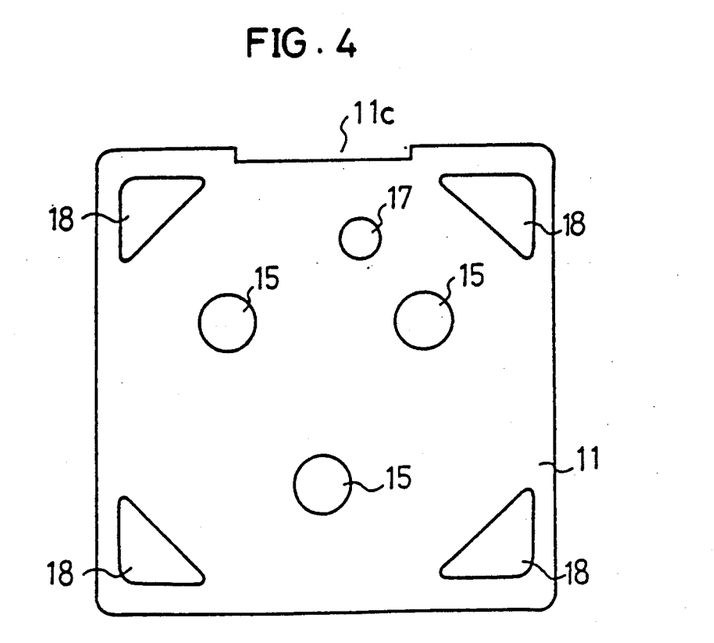
FIG. 4 is a bottom view of the closure.

A projection 17 provided on the bottom side of the closure 11 is positioned in corresponding relation to the mode change key 8 as shown in FIG. 4.

Projecting from the respective four corners of the closure 11 on the bottom side thereof are legs 18 fittable in the respective cavities 9 in the telephone body 1 and each having a metal piece 19 embedded therein as seen in FIG. 5.

Figure 6:
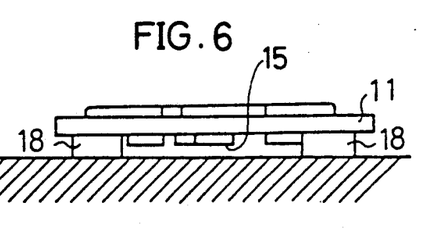
FIG. 6 is a side elevation showing the closure as placed on a floor.

The legs 18 have such a length that when the closure 11 is placed, for example, on a floor, the retainers 15 will not contact the floor as shown in FIG. 6.

FIGS. 3 and 4 show that the closure 11 has a finger notch 11c so as to be removable easily.

With the closure 11 removed from the body 1 as in FIG. 1, the mode change key 8 is off, and the telephone is set in the usual dialing mode, in which a telephone number in the form of a series of digits and entered by depressing some of the usual dialing push buttons 6 is transmitted to the telephone lines as dial signals.

Figure 8:
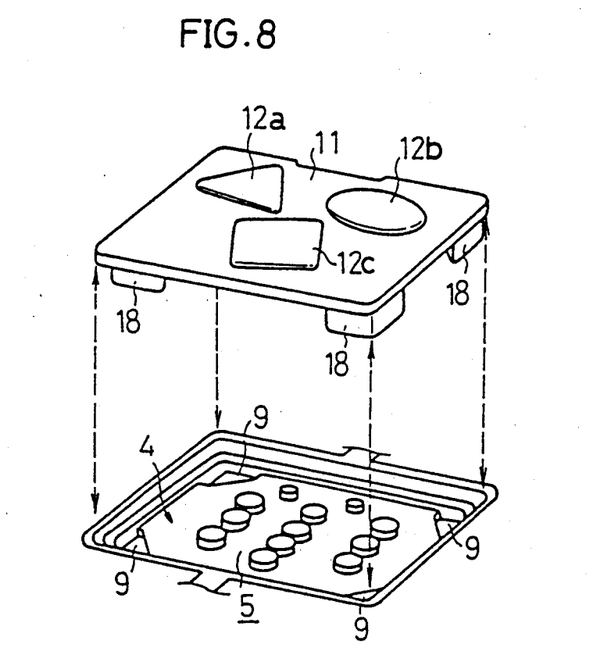
FIG. 8 is a perspective view showing means for engaging the closure with the telephone body.

When the closure 11 is fitted in the recess 4 with the legs 18 on the closure fitted in the respective cavities 9 in the recessed portion 4 of the telephone body 1 as seen in FIGS. 8 and 9, the magnet 10 embedded in the bottom of each cavity 9 magnetically attracts the metal piece 19 embedded in each leg 18, whereby the closure 11 is held in the recess 4.

With the closure 11 thus attached to the body 1, the mode change key 8 is pressed by the projection 17 on the closure 11 to thereby set the telephone in the automatic dialing mode. The retainers 15 of the respective automatic dialing push buttons 12a to 12c on the closure 11 are opposed to the tops KT of the respective specified digit keys.

Accordingly, when one of the automatic dialing bush buttons 12a, 12b, 12c is depressed, the depression of the button depresses one of the usual dialing push buttons 6 with the specified digit, whereupon the telephone number in the form of a series of digits and pre-stored in corresponding relation to the digit key is transmitted as converted to dial signals to the telephone lines.

Figure 20:
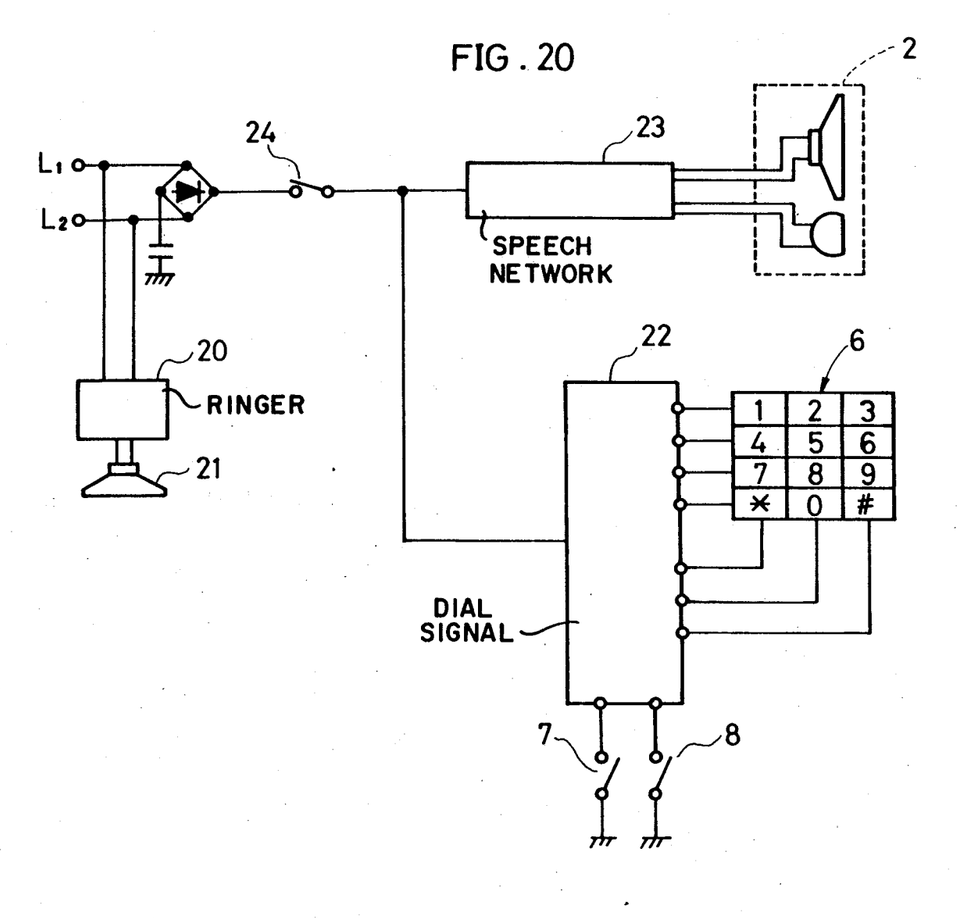
FIG. 20 is a block diagram showing the electrical construction of the first embodiment.

FIG. 20 shows the electrical construction of the telephone described above. A dial signal circuit 22 having a memory incorporated therein has connected thereto the usual dialing push buttons 6, i.e. the digit keys, the memory key 7 to be depressed when desired telephone numbers are stored in the memory in the automatic dialing mode, and the mode change key 8. When the handset 2 is lifted off the telephone body, a hook switch 24 is closed. When some of the usual dialing push buttons 6 are manipulated in this state, the dial signal circuit 22 prepares dial signals comprising pulse signals or DTMF signals in accordance with the depressed digit keys and delivers the signals to telephone lines $L_1$ and $L_2$. While the telephone is in operation for communication, the communication is made between the handset 2 and an external telephone circuit through a speech network 23.

The calling signal from outside is received by a ringer circuit 20, which in turn feeds a ringer signal to a speaker 21 in the telephone body 1.

The telephone described above is so adapted that when the closure 11 is attached to the body 1 as seen in FIG. 2, the automatic dialing push buttons 12a, 12b, 12c only are left exposed for manipulation, so that especially when children place a call to their grandfather or mother or friends utilizing the automatic dialing function, there is no likelihood that the child will depress some other unnecessary bush button in error. Moreover, the automatic dialing push buttons have different shapes, such as triangular, square and circular shapes. This is very useful for children to readily recognize the subscriber to be called.

Second Embodiment

Although the closure 11 is held to the telephone body 1 by the magnets 10 according to the first embodiment, the second embodiment is characterized in that it has a locking assembly for holding the closure 11 to the telephone body 1 more effectively and an unlocking preventing assembly for preventing unfastening of the locking assembly as will be described below.

Figure 11:
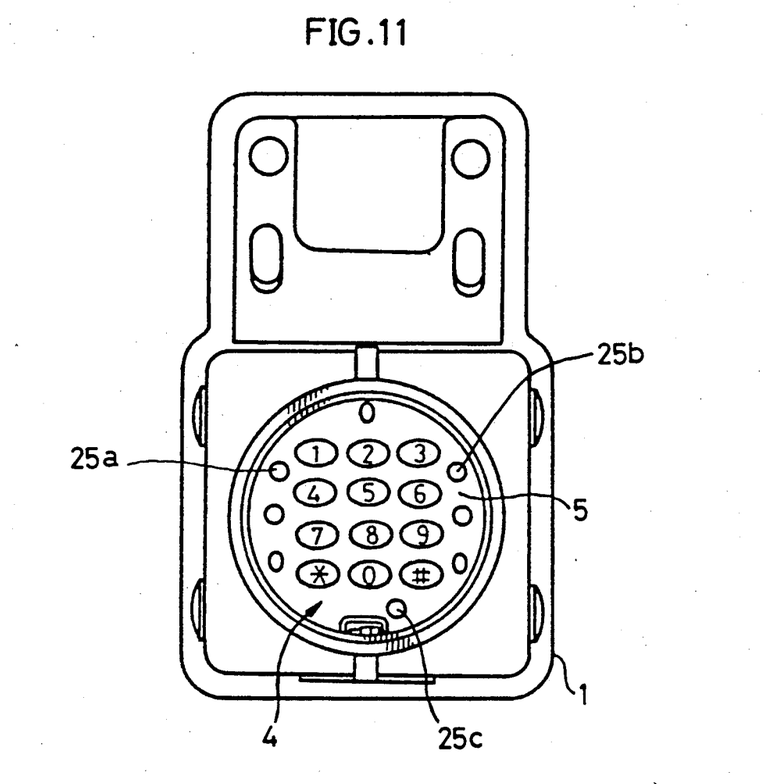
FIG. 11 is a plan view of the body of the telephone.
Figure 12:
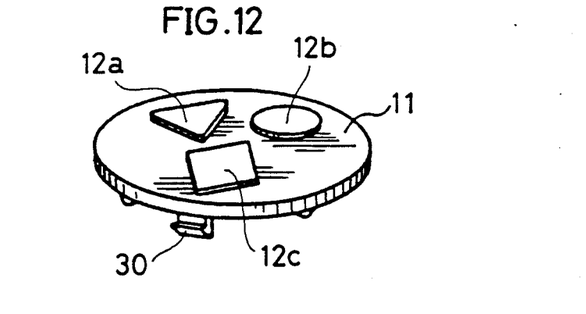
FIG. 12 is a perspective view of a closure.

Further with the first embodiment, some of the usual dialing push buttons 6 (digit keys) on the operation panel 5 are responsive to the depression of the automatic dialing push buttons, whereas with the second embodiment, the operation panel 5 has a plurality of specific keys 25a, 25b and 25c for performing the automatic dialing function besides the digit keys serving as the usual dialing bush buttons as shown in FIG. 11.

Figure 10:
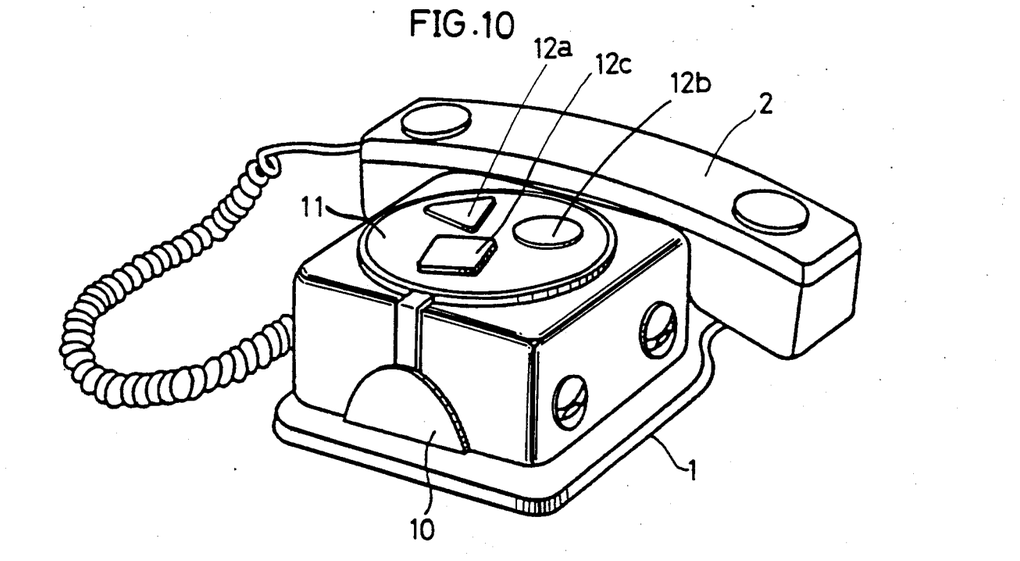
FIG. 10 is a perspective view showing the appearance of the telephone.

As shown in FIG. 10, the closure 11 has a plurality of automatic dialing push buttons 12a, 12b, 12c corresponding to the specific keys 25a, 25b, 25c.

Figure 13:
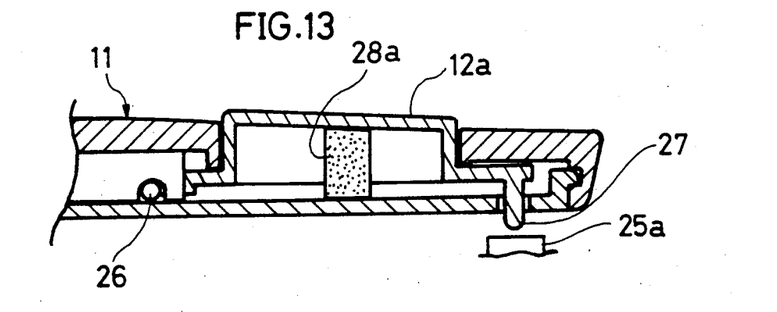
FIG. 13 is an enlarged fragmentary view in section of the closure.

With reference to FIG. 13, the automatic dialing push button 12a has at its one end a pivot 26 supported by the closure 11 inside thereof and is provided at the other end thereof with a projection 27 Interposed between the push button 12a and the bottom plate of the closure 11 is an elastic member 28a for raising the push button 12a upward. Accordingly, the bush button 12a, when pushed down, depresses the specific key 25a to close the contact of the key. The other automatic dialing push buttons 12b and 12c also have the same construction as the button 12a.

Figure 21:
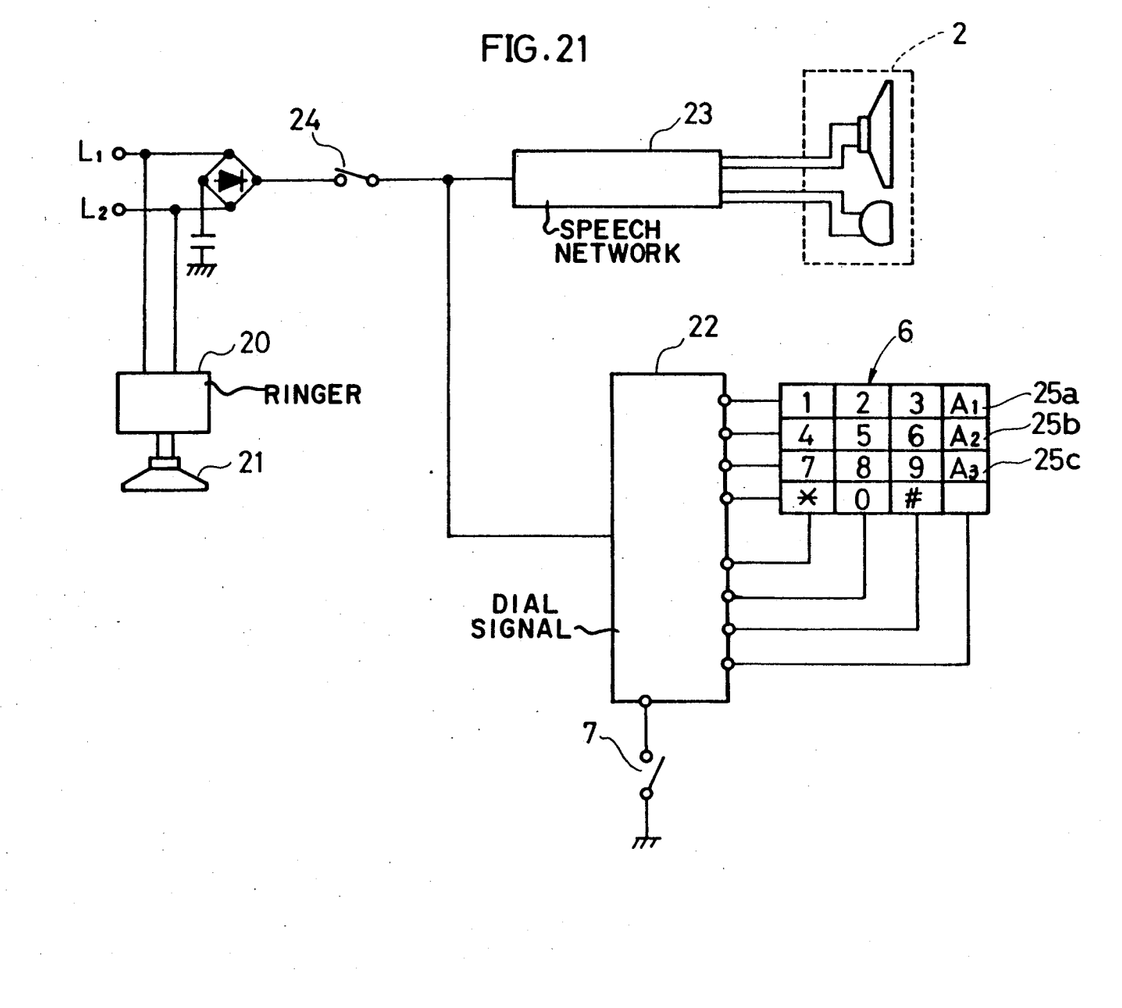
FIG. 21 is a block diagram showing the electrical construction of the second embodiment.

FIG. 21 shows the electrical construction of the telephone which is the same as the construction shown in FIG. 20 except that the mode change key 8 is omitted and that the specific keys 25a, 25b, 25c provided in addition to the usual dialing push buttons 6 are connected to the dial signal circuit 22.

Accordingly, when the desired one of the specific keys 25a to 25c is depressed in the automatic dialing mode wherein the closure 11 is attached to the telephone body 1, the telephone performs the automatic dialing function, whereby a telephone number in the form of a series of digits and pre-stored is called from the memory of the dial signal circuit 22 and automatically transmitted to telephone lines $L_1$ and $L_2$ in the form of dial signals.

Such dial signals are of course transmitted automatically similarly also when the specific key 25a, 25b or 25c on the telephone body 1 is directly depressed with the closure 11 removed from the body 1.

Conventional means for removably holding an attachment to the body of a device include, for example, the one employed for holding a remote control transmitter and disclosed in Unexamined Japanese Utility model Publication SHO 59-121873. The transmitter is accommodated in a recessed portion formed in a cabinet. The disclosed means comprises a lock member for locking the transmitter as held in the recessed portion, and a release button for unfastening the lock member.

This conventional means can be used for the present embodiment for holding the closure 11 to the telephone body 1, whereas if the release button is manipulated inadvertently by the user or mischievously by children, the closure 11 will slip off the telephone body 1 and is likely to become lost in the worst case.

The present embodiment is therefore provided with an unlocking prevent assembly adapted to prevent unfastening of a lock assembly in operative relation therewith.

Figure 19:
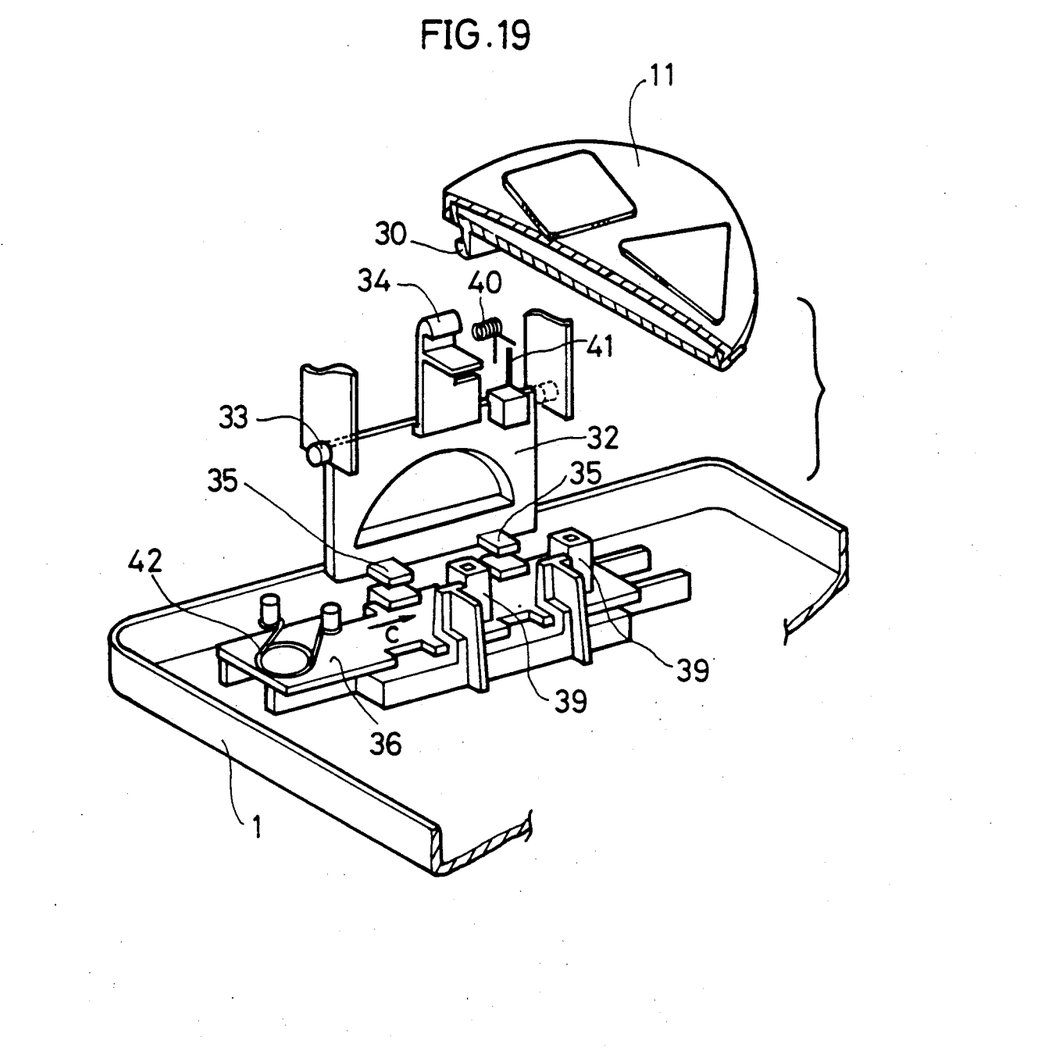
FIG. 19 is an exploded perspective view of the locking assembly and the unlocking preventing assembly.

The lock assembly will be described first with reference to FIGS. 15, 16 and 19.

The closure 11 has a latch 31 projecting horizontally from one end thereof close to the cradle, and a hook 30 projecting downward from the other end thereof.

On the other hand, the recessed portion 4 of the telephone body 1 for the closure 11 to fit in is formed with a notch 29 for the closure latch 31 to engage in and with a hole 28 for the hook 30 to be inserted therethrough.

Disposed inside the casing of the body 1 is a lock member 32 which is to be manipulated to unlock the closure 11. The member 32 is so supported as to be pivotally movable about pivots 33, 33 projecting laterally from its opposite sides. The lock member 32 has a hook 34 projecting from its movable upper end and engageable with the hook 30 of the closure 11, and an unlocking knob 43 positioned below the pivots 33 and exposed from a window formed in the casing front wall of the body 1 so as to be accessible. A pair of contact pieces 35, 35 projecting inwardly of the casing is provided at the lower end of the unlocking knob 43.

Figure 16:
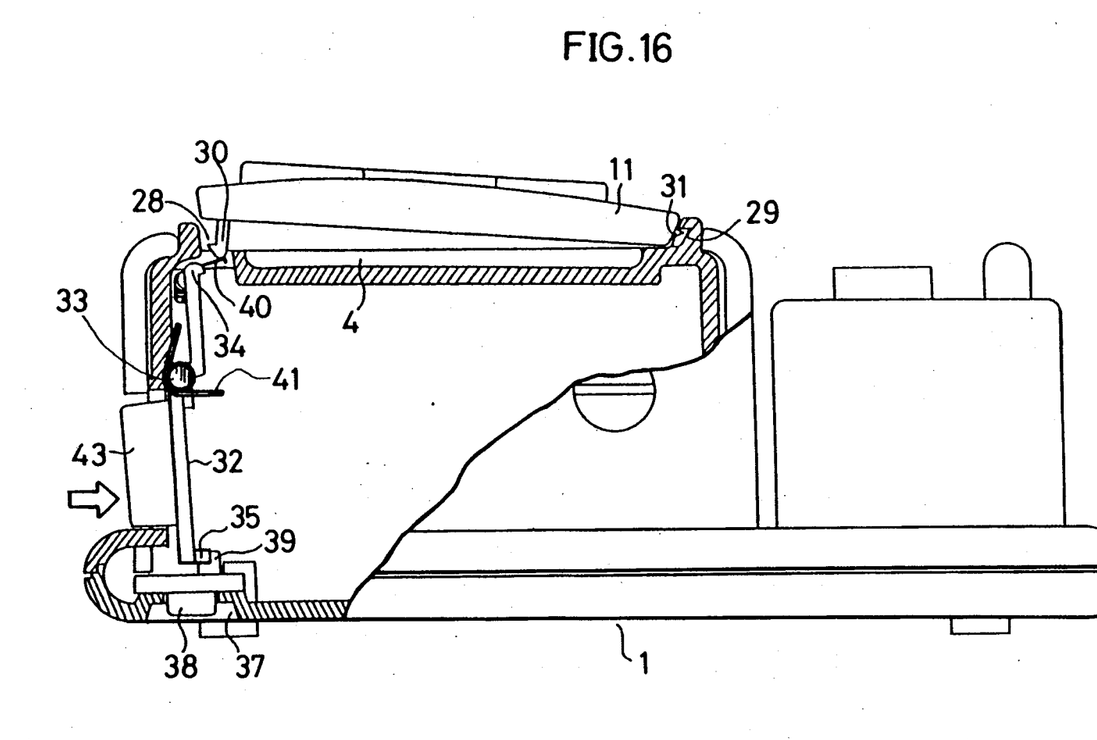
FIG. 16 is a side elevation partly broken away of the telephone body to show the locking assembly as unfastened.

The casing upper wall of the body 1 is provided with a first torsion spring 40 for pushing up the closure 11 as released from the lock member 32 as shown in FIG. 16.

Figure 15:
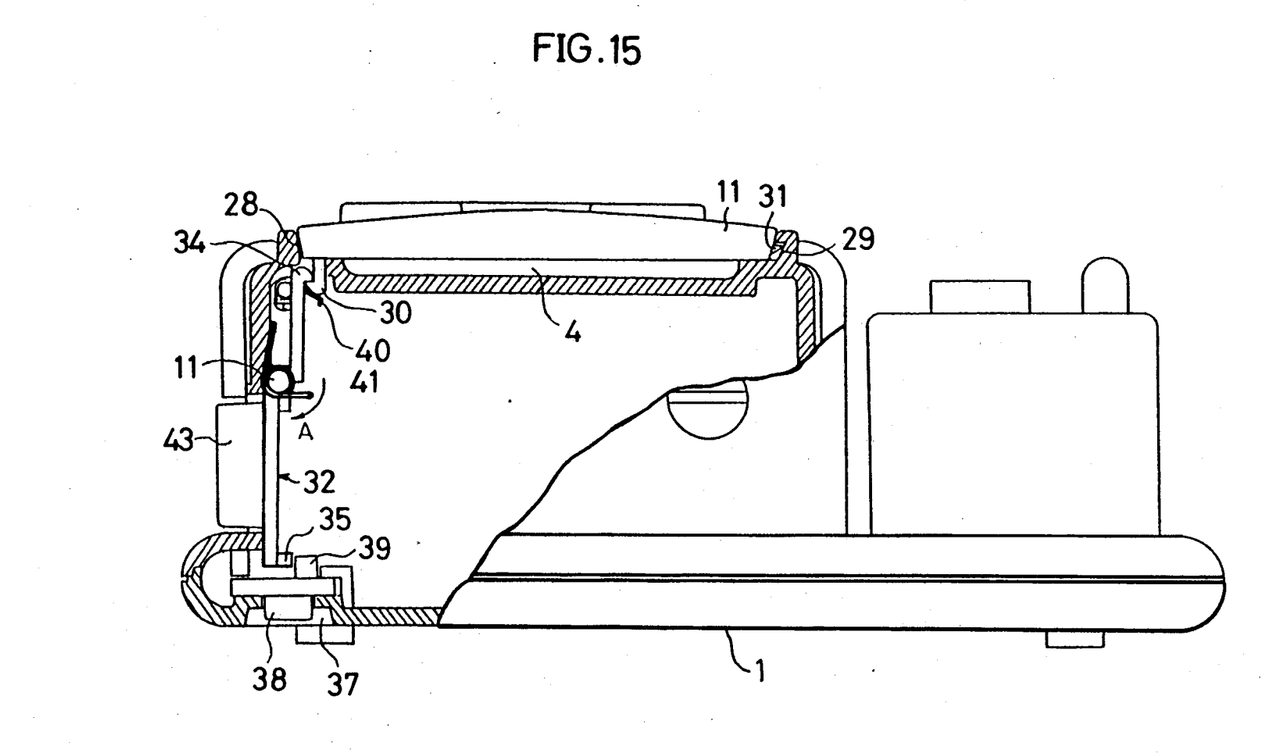
FIG. 15 is a side elevation partly broken away of the telephone body to show the closure as locked to the body by a locking assembly.

The lock member 32 is biased to rotate in the direction of arrow A shown in FIG. 15 by a second torsion spring 41 attached to the pivot 33.

Accordingly, when the closure 11 is to be attached to the telephone body 1, the latch 31 of the closure 11 is inserted into the notch 29 of the recessed portion 4 of the body 1, and the hook 30 of the closure 11 is further depressed against the action of the first torsion spring 40. This causes the head of the hook 30 to push the head of the hook 34 of the lock member 32. The portions of the heads in contact with each other produce a cam action, whereby the lock member 32 is pivotally moved temporarily in a direction opposite to the arrow A. Immediately thereafter, the action of the second torsion spring 41 brings the hook 34 of the lock member 32 into engagement with the hook 30 of the closure 11 as shown in FIG. 15.

The closure 11 is held in this state in the recess 4 of the telephone body 1 against slipping off.

To remove the closure 11 from the body 1, the unlocking knob 43 of the lock member 32 is pushed against the action of the second torsion spring 41 as seen in FIG. 16. This disengages the hook 34 of the lock member 32 from the hook 30 of the closure 11 to unlock the closure 11, whereupon the closure 11 is lifted by the first torsion spring 40 as illustrated. In this way, the closure 11 is easily removable from the telephone body 1.

The unlocking preventing assembly will be described next with reference to FIGS. 17, 18 and 19.

An unlocking preventing member 36 is provided on the bottom wall of the casing of the body 1 and is slidable sidewise. A third torsion spring 42 connected between the telephone body 1 and the preventing member 36 biases the member 36 toward the direction of arrow C in FIG. 19.

Figure 14:
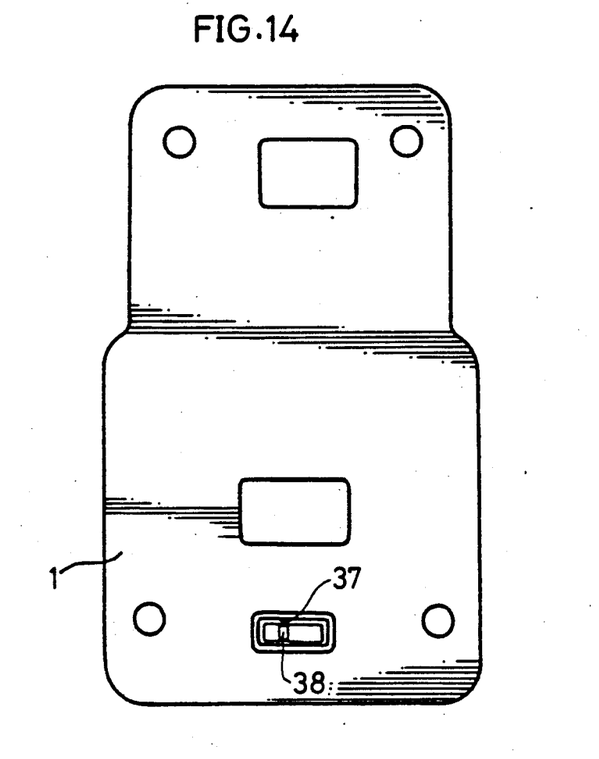
FIG. 14 is a bottom view of the telephone body.

A knob 38 projecting downward from the unlocking preventing member 36 extends through the casing bottom wall of the body 1 and has its lower end position in a recess 37 formed in the bottom wall as shown in FIG. 14. A pair of bearing pieces 39, 39 projecting from the preventing member 36 are positioned inwardly of the pair of contact pieces 35, 35 and arranged at the same spacing as the contact pieces 35, 35.

Figure 17:
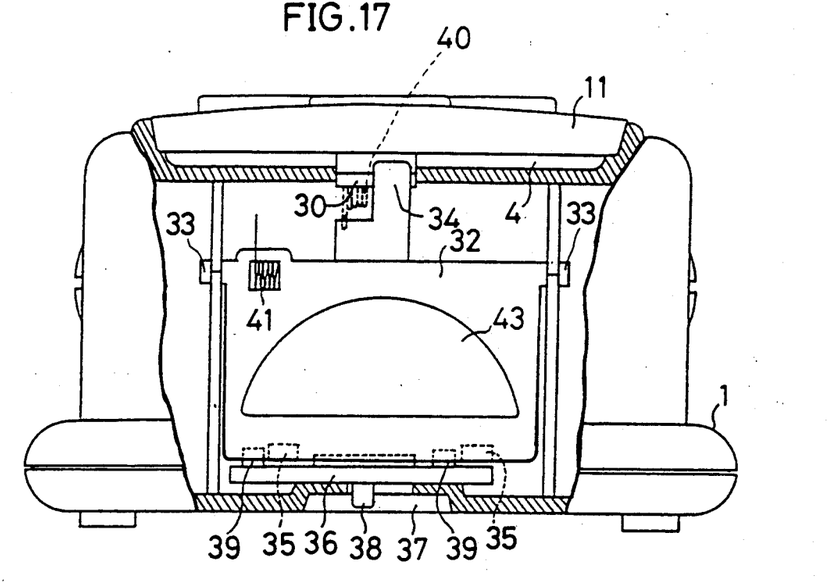
FIG. 17 is a front view partly broken away of the telephone body showing an unlocking preventing assembly while allowing the closure to be unlocked.

With reference to FIG. 17, the unlocking preventing member 36 is retained usually in its leftward limit position by being biased by the third torsion spring 42. In this state, the bearing pieces 39, 39 are positioned as displaced from the respective contact pieces 35, 35, rendering the lock member 32 free to move pivotally. The closure 11 can therefore be unlocked by pushing the unlocking knob 43 as already described.

Figure 18:
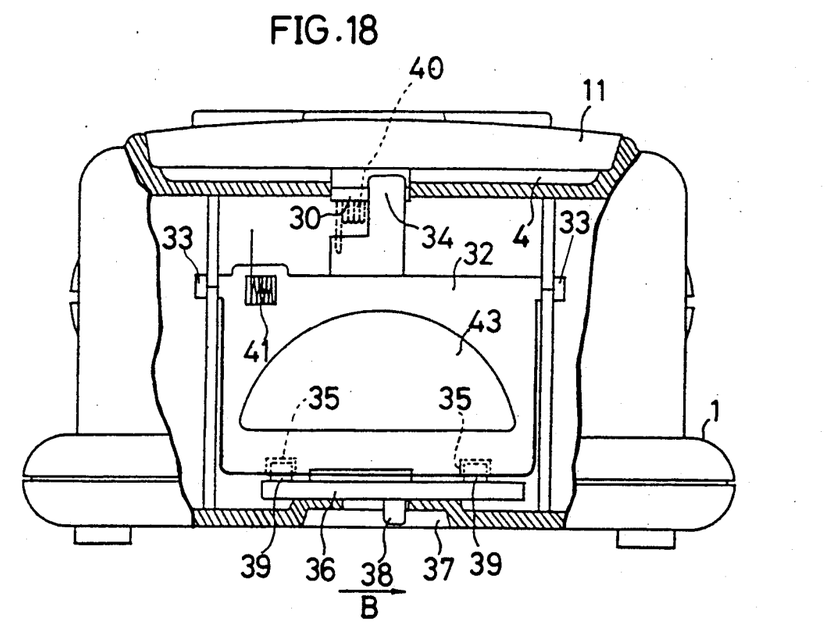
FIG. 18 is a front view partly broken away of the telephone body to show the unlocking preventing assembly while preventing the closure from being unlocked.

When the unlocking preventing member 36 is moved in the direction of arrow B shown in FIG. 18 to the other limit position with the knob 38, the two bearing pieces 39, 39 are brought into register with the respective contact pieces 35, 35. Consequently, even if the unlocking knob 43 is pushed, the lock member 32 is not movable owing to the contact of the contact pieces 35, 35 with the respective bearing members 39, 39. In this state, therefore, the closure 11 can not be unlocked.

The closure 11 can be unlocked after the knob 38 is shifted to the position shown in FIG. 17. Since the knob 38 is provided on the rear side of the telephone body 1, it is unlikely that the closure 11 will be unlocked inadvertently by the user or mischievously by children.

Like the first embodiment, the present embodiment of course has the advantage that in the automatic dialing mode, the closure 11 entirely covering the operation panel 5 obviates the likelihood that the push button irrelevant to the automatic dialing function will be pushed in error.

The construction of the telephone of the invention is not limited to those of the foregoing embodiments but can of course be modified variously by one skilled in the art without departing from the scope of the invention as defined in the appended claims.

For example, the closure 11 can be hingedly connected to the telephone body 1 so as to be openable or closable as attached to the body 1. This obviates the likelihood of the closure becoming lost.

With the foregoing two embodiments, the automatic dialing push buttons on the closure 11 merely serve as members for depressing the specified digit keys or specific keys on the operation panel 5 of the telephone body 1, whereas it is possible to use input keys, each having a contact like the digit keys, as the automatic dialing push buttons on the closure 11, with the contacts of the input keys connected directly to the dial signal circuit 22 of FIG. 20 or 21. In this case, the closure 11 is connected to the telephone body 1 with a cord. The mode change key 8 of FIG. 20, or the specific keys 25a, 25b, 25c can then be dispensed with.

While the invention has been particularly shown and described in reference to preferred embodiments thereof, it will be understood by those skilled in the art that changes in form and details may be made therein without departing from the spirit and scope of the invention.

What is claimed is:

1. A telephone having a plurality of standard dialing push buttons arranged on an operation panel on a body of the telephone for entering telephone numbers, the telephone body being internally provided with a memory for prestoring therein at least one telephone number of at least one subscriber to be called and with a dial signal circuit for retrieving telephone number data from the memory in response to an input signal for placing a call to a desired subscriber and transmitting the data to telephone lines upon conversion to dial signals, the telephone comprising:
a closure for removably covering the surface of the operation panel on the telephone body;
at least one automatic dialing push button respectively arranged on the surface of the closure, wherein data representing at least one telephone number is storable in the memory in corresponding relation to the automatic dialing push button, and wherein the telephone body includes means for detecting depression of the automatic dialing push button with the covering of the telephone panel with the closure in a closed state and feeding a detection signal to the dial signal circuit for the circuit to transmit to the telephone lines the telephone number data corresponding to the depressed automatic dialing push button and in the form of dial signals.

2. A telephone as defined in claim 1, wherein the detecting means includes at least one specified button among the standard dialing push buttons on the operation panel on the telephone body, and a mode change key provided on the operation panel for setting an automatic dialing mode whereby the automatic dialing push button becomes operable, the closure having a projection for depressing the mode change key when the closure is closed relative to the telephone body, the specified standard dialing push button respectively corresponding to the automatic dialing push button so that when the automatic dialing push button is manipulated with the closure covering the telephone body, the manipulated automatic dialing push button depresses the standard dialing push button corresponding thereto to retrieve the stored telephone number data corresponding to the depressed standard dialing push button.

3. A telephone as defined in claim 1, wherein the detecting means includes at least one specific key arranged on the operation panel on the telephone body, the specific key corresponds to the automatic dialing push button so that when the automatic dialing push button is manipulated with the closure covering the telephone body, the manipulated automatic dialing push button depresses the specific key corresponding thereto to retrieve the stored telephone number data corresponding to the depressed specific key.

4. A telephone as defined in claim 1, wherein the closure is formed separately from the telephone body and removably attached to the body.

5. A telephone as defined in claim 4, wherein the telephone body has a portion engageable with the closure and provided with an assembly for releasably locking the closure to the telephone body.

6. A telephone as defined in claim 5, wherein the locking assembly is provided with an unlocking means for preventing the unlocking action of the assembly, and wherein the unlocking means has a knob exposed at the bottom of the telephone body.

7. A telephone as defined in claim 1, wherein the closure is openably attached to the telephone body.

8. A telephone as defined in claim 1, wherein the automatic dialing push button on the closure are different from one another in shape, color or pattern.

9. A telephone having a plurality of standard dialing push buttons arranged on an operation panel on a body of the telephone for entering telephone numbers, the telephone body being internally provided with a memory for pre-storing therein at least one telephone number of at least one subscriber to be called and with a dial signal circuit for retrieving telephone number data from the memory in response to an input signal for placing a call to a desired subscriber and transmitting the data to telephone lines upon conversion to dial signals, the telephone comprising:

a closure for removably covering the surface of the operation panel on the telephone body;

a plurality of automatic dialing push buttons being arranged on the surface of the closure, wherein data representing at least one telephone number is storable in the memory in corresponding relation to the automatic dialing push button, and wherein the telephone body includes means for detecting depression of the automatic dialing push button with the covering of the telephone panel with the closure in a closed state and feeding a detection signal to the dial signal circuit for the circuit to transmit to the telephone lines the telephone number data corresponding to the depressed automatic dialing push button and in the form of dial signals, wherein the detecting means includes at least one specified button among the standard dialing push buttons on the operation panel on the telephone body, and a mode change key provided on the operation panel for setting an automatic dialing mode whereby at least one of the automatic dialing push buttons becomes operable, the closure having a projection for depressing the mode change key when the closure is closed relative to the telephone body, the at least one specified standard dialing push button respectively corresponding to at least one of the automatic dialing push buttons so that when the automatic dialing push button is manipulated with the closure covering the telephone body, the manipulated automatic dialing push button depresses the standard dialing push button corresponding thereto to retrieve the stored telephone number data corresponding to the depressed standard dialing push button.

* * * * *